INVENTOR.
JOHANNES G. VAN SANTEN
WILHELMUS A. J. M. ZWIJSEN
BY Frank R. Trifari
AGENT INVENTOR.
JOHANNES G. VAN SANTEN
WILHELMUS. A.J.M. ZWIJSEN
BY
Frank R. Trifari
AGENT United States Patent Office 3,394,404
Patented July 23, 1968

3,394,404
ARRANGEMENT FOR SWITCHING ELECTRIC CIRCUITS BY MOMENTARILY TOUCHING A CONTACT

Johannes Gerrit Van Santen, and Wilhelmus Antonius Joseph Marie Zwijsen, Emmasingel, Eindhoven, Netherlands, assignors to North American Philips Company Inc., New York, N.Y., a corporation of Delaware

Filed Sept. 8, 1964, Ser. No. 394,810
Claims priority, application Netherlands, Sept. 25, 1963, 298,400
4 Claims. (Cl. 250—209)

ABSTRACT OF THE DISCLOSURE

A switching circuit is provided with a number of luminescent elements and a like number of radiation sensitive resistors. Momentarily touching a contact will result in light emanating from a luminescent element and impinging on a radiation sensitive resistor which in turn energizes further luminescent elements and further radiation sensitive resistors. The resistors, acting as switches, are employed to witch loads into and out of an associated circuit.

The invention relates to an arrangement for switching an electric circuit in which a switching operation is initiated by momentarily touching, for example with a finger, a contact connected in series with a light-radiating element and a voltage source.

Such an arrangement is known. When a finger touches the contact, a current passes through a relay coil in series with the element. The relay coil energizes a relay, while the element radiates light and thus has a checking effect.

The invention has for its object to extend this suitable and simple method of influencing an electric circuit. Particular examples thereof are wavelength or tuner switches in radio and television receivers and keyboards for electronic computers and the like. In the known arrangements comprising mechanical wavelength switches and keyboards respectively, comparatively great mechanical forces are required for the operation of these switches and keyboards respectively. Particularly with lightweight devices and computers, this is a disadvantage.

The invention has for its object to obviate this disadvantage. It is characterized in that the flash of light produced when the contact is touched momentarily impinges upon a radiation-sensitive resistor either in a storage device associated with the electric circuit or in a circuit arrangement controlling a radiation-sensitive resistor in a storage device associated with the electric circuit, as a result of which the electric circuit is switched into circuit and remains in this condition.

According to a further feature of the invention, various electric circuits are switched, switching-on of one circuit resulting in switching-off of the other circuits. Each storage device preferably consists of electroluminescent elements and radiation-sensitive elements.

The invention will now be described more fully with reference to the accompanying drawing, in which:

FIG. 2 shows a second embodiment of a wavelength switch in accordance with the invention;

FIG. 3 shows a principal circuit diagram of a so-called full keyboard for a table computer, while

Figure 1:
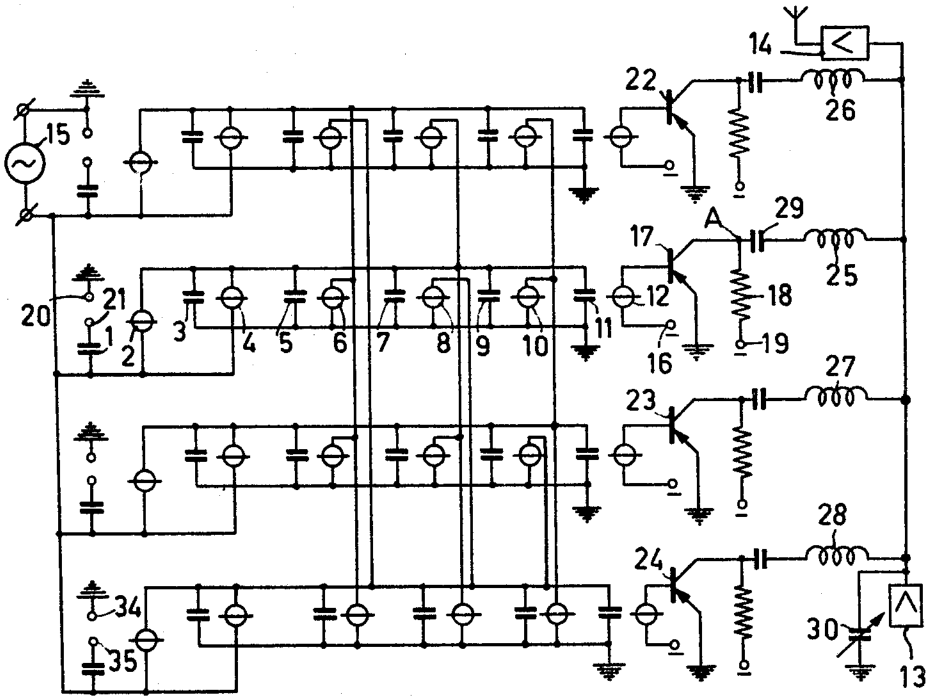
FIG. 1 shows a first embodiment of a wavelength switch in accordance with the invention.

The wavelength or tuner switch of FIG. 1 comprises four similar sections each built up of six combinations of electroluminescent elements and photosensitive resistors. One of the sections consists of the combinations 1, 2; 3, 4; 5, 6; 7, 8; 9, 10; 11, 12. The electroluminescent elements are designated by odd numerals and the photosensitive resistors by even numerals. The element 1 is connected in series with the pair of contacts 20, 21 to the voltage source 15. The elements 3, 5, 7, 9 and 11 are connected through the photosensitive resistors 2 and 4 to the same voltage source 15.

Each of the photosensitive resistors 6, 8 and 10 is connected in parallel with the elements in one of the other sections corresponding to the elements 3, 5, 7, 9 and 11. For example, the resistor 6 is connected in parallel with the concerned elements in the uppermost section, while the resistor 8 is connected in parallel with the concerned elements in the lowermost section.

The photosensitive resistor 12 which is coupled to the electroluminescent element 11 is connected between the base of the pnp transistor 17 and a point of constant negative potential. The collector of the transistor 17 is connected to a control electrode of an active element in the receiver portion 13. This receiver portion is built-up in the usual manner and consequently comprises a mixer stage, an amplifier portion, a detector portion and a final stage. The parallel circuit 25, 30 is connected between the receiver portion 13 and the pre-amplifier stage 14. The capacitor 30 is variable and serves to tune one of the circuits 25, 30; 26, 30; 27, 30; and 28, 30 to the desired frequency in a given wave range. In particular, the circuit 25, 30 is tuned, for example, in the medium wave range. The capacitor 29 is a blocking capacitor and has a negligible impedance for the signals to be amplified.

The circuit arrangement operates as follows. When the pair of contacts 20, 21 is bridged, for example by a finger which touches these contacts with a very slight pressure, the electroluminescent element 1 is caused to luminesce, as the voltage supplied by the voltage source 15 is largely sufficient to ignite the element 1. The light radiated by this element impinges upon the photosensitive resistor 2. This resistor consequently becomes conducting so that the voltage of the voltage source 15 becomes available for the electroluminescent elements 3, 5, 7, 9 and 11 for a part such that these elements luminesce in turn. This has a few consequences.

Firstly, as a result of the exposure of the photosensitive resistor 4, the voltage across the elements 3, 5, 7, 9 and 11 is maintained, also when the pair of contacts 20, 21 is no longer bridged so that the element 1 extinguishes.

Secondly (as a result of the resistor 12 becoming conducting) the base potential of the transistor 17 is reduced. The transistor 17, which at first was in the blocked state, becomes conducting, so that the potential of point A increases approximately to earth potential. As a result, the circuit 25, 30 is switched into circuit.

Thirdly, the elements in the three remaining sections corresponding to the elements 5, 7 and 9 are extinguished, since the voltage drop across the resistors 6, 8 and 10 coupled to the elements 5, 7 and 9 (which resistors become conducting as a result of the radiation) is strongly reduced, so that also the voltage across said elements is strongly reduced. As a result, the transistors 22, 23 and 24 pass to the cut-off state while the associated circuits 26, 30; 27, 30 and 28,30 are or remain switched out of circuit.

In a manner analogous to that described hereinbefore, one of the circuits 26, 30; 27, 30 and 28, 30 is switched into circuit and the other circuits are switched out of circuit when the pair of contacts associated with the concerned circuit is bridged. For example, by touching the pair of contacts 34, 35, the circuit 28, 30 is switched into circuit and the circuits 26, 30; 25, 30 and 27, 30 are switched out of circuit.

For visualizing the wavelength range switched into circuit, a photocell indicator (not shown) may be exposed by the element 11. The photocell indicator then energizes a relay which causes a suitably arranged luminescent element to luminesce.

One of the contacts of a pair of contacts may be constituted by a capacitance, for example, that of the human body which touches the other contact through a finger.

Figures 2, 3:
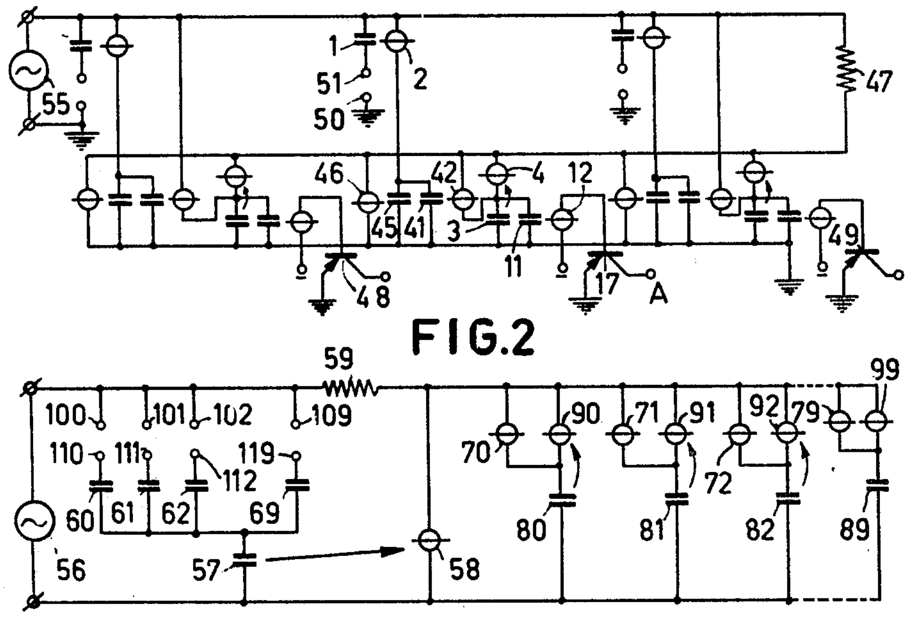

FIG. 2 illustrates another embodiment of a wavelength or tuner switch in accordance with the invention. In this figure, three similar sections are shown each of which consists of five combinations of electroluminescent elements and photosensitive resistors, that is to say the combinations 1, 2; 3, 4; 11, 12; 41, 42 and 45, 46. The pairs which have the same functions in FIGS. 1 and 2 are provided with the same reference numerals.

The element 1 is connected, in series with the pair of contacts 50, 51, to the voltage source 55. The elements 41 and 45 are connected through the photosensitive resistor 2 to the voltage source 55, while the elements 3 and 11 are connected on the one hand through the photosensitive resistor 42 and on the other hand through the photosensitive resistor 4 and the resistor 47 to this voltage source. As a matter of fact, the elements 3 and 11, and the elements 41 and 45 respectively, may be joined so as to form one element.

The circuit arrangement operates as follows. When the pair of contacts 50, 51 is bridged, for example by a slight pressure of the finger, the element 1 is caused to luminesce. The resistor 2 becomes conducting as a result of the incident radiation. The parallel-connected elements 41 and 45 consequently luminesce, as a result of which the photosensitive resistors 42 and 46 coupled to these elements become conducting. When the resistor 42 becomes conducting, the elements 3 and 11 are ignited so that in turn the photosensitive resistors 4 and 12 become conducting.

Just as in the circuit arrangement of FIG. 1, the operation consists of three steps.

Firstly, the transistor 17 becomes conducting and the receiver part (not shown) corresponding to the circuit 25, 30 in FIG. 1 is switched into circuit.

Secondly, the voltage across the elements in the other sections corresponding to the element 11 fails out when the photosensitive resistor 46 becomes conducting. The transistors 48 and 49 pass to the cut-off state.

Thirdly, when the finger pressure no longer exists, the element 1 and hence the elements 41 and 45 are extinguished. This results inter alia in the photosensitive resistor 42 returning to the non-conducting state. However, the element 3 and hence also the element 11 continue to luminesce, since the element 3 is now fed through the conducting resistor 4 and the resistor 47.

The circuit arrangement of FIG. 2 has, in comparison with that of FIG. 1, the advantage that irrespective of the number of sections, the number of combinations per section is constant in the first case and increases in the second case. It may easily be understood that with $n$ sections the number of combinations is $5n$ in FIG. 2 and $n(n+2)$ in FIG. 1. Consequently, already for $n>3$, the circuit arrangement of FIG. 2 is to be preferred to that of FIG. 1. This is particularly evident with television receivers in which $n$ may be $=12$.

In an embodiment of the circuit arrangement of FIG. 2, the electroluminescent elements were of an experimental type; the photosensitive resistors were CdSe resistors of an experimental type. The transistors 17, 48 and 49 were of the type OC47. The resistor 47 had a value of 330KΩ, the voltage source 55 supplied an alternating voltage of 200 v., 1000 c./s.

FIG. 3 shows a section of a so-called full keyboard for a computer, more particularly that section which operates the row of unities. The sections of the rows of tens, hundreds and so on are built up in the same manner.

An alternating-voltage source 56 feeds the series-combination of an electroluminescent element 57 and a parallel-combination of ten series-combinations of electroluminescent elements 60 to 69 and pairs of contacts 100, 110 to 109, 119. For the sake of simplicity, only four of the series-combinations are shown.

The alternating-voltage source moreover feeds through a resistor 59 the parallel-combination of a photosensitive resistor 58 and ten similar combinations of two parallel-connected photosensitive resistors in series with an electroluminescent element (four of the ten combinations are shown in the figure). In each combination, one of the photosensitive resistors is coupled to the electroluminescent element of the concerned combinations while the other resistor is coupled to one of the elements connected in series with a pair of contacts. For example, the resistor 91 is coupled to the element 81 and the resistor 71 to the element 61.

The circuit arrangement operates as follows. When the pair of contacts 102, 112 is bridged, for example by a finger touching this pair, the elements 62 and 57 luminesce. The photosensitive resistor 58 coupled to the element 57 becomes conducting so that the voltage across the ten similar combinations referred to hereinbefore strongly decreases, as a result of which the elements 80 to 89 no longer luminesce. The photosensitive resistor 72 coupled to the element 62 also becomes conducting.

When the finger is taken away so that the pair of contacts 102, 112 is no longer bridged, the elements 62 and 57 extinguish. The properties of the photosensitive resistors 58 and 72 are chosen to be so that the absolute value of the resistor 58 increases more rapidly than that of the resistor 72 and thus may be said to have a shorter time constant. This may be obtained in different ways. Either the pattern or the material of the photosensitive resistors 58 and 72 may be chosen to be so that the value of the resistor 58 exceeds that of the resistor 72, both resistors being measured under the same conditions of exposure. Thirdly, a delaying intermediate stage may be connected between the element 62 and the photosensitive resistor 72. This intermediate stage consists of a series-combination of a photosensitive resistor optically coupled to the element 62 and an electroluminescent element optically coupled to the resistor 72 connected to the voltage source 56.

When the element 62 is extinguished, this has in these three cases for its result that the absolute value of the resistor 72 always remains smaller than that of the resistor 58. Consequently, when the finger is taken away so that the concerned pair of contacts is no longer bridged, the value of the photosensitive resistor 72 is still sufficiently low to cause the electroluminescent element 82 to luminesce.

Figure 4:
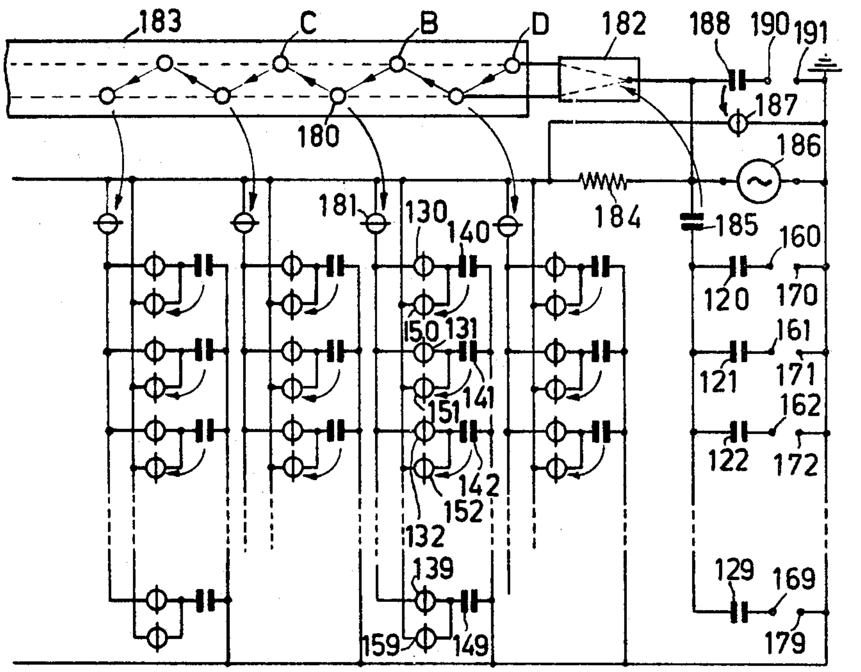
FIG. 4 shows a principal circuit diagram of a so-called singular keyboard for a table computer.

FIG. 4 shows four sections of a so-called singular keyboard. Each section is connected through resistor 184 to a voltage source 186 and consists of ten parallel branches. Each branch comprises the series-combination of a photosensitive resistor (130 to 139) and an electroluminescent element 140 to 149). The junctions of the photosensitive resistors and the electroluminescent elements are connected through a photosensitive resistor (150 to 159) to the end of the resistor 184 remote from the voltage source 186.

The voltage source 186 is further connected through the electroluminescent element 185 to the parallel-combination of ten series-combinations each consisting of an electroluminescent element (120 to 129) and pairs of contacts (160, 170 to 169, 179). The electroluminescent elements 120 to 129 are each coupled to a photosensitive resistor 130 to 139 and the elements 140 to 149 are each coupled to a photosensitive resistor 150 to 159. The last-mentioned coupling joints are indicated in the figure by arrows.

The voltage source 186 feeds and the element 185 controls the bistable multivibrator 182 which in turn controls the ring counter 183.

The circuit arrangement operates as follows. When a pair of contacts, for example 161, 171, is bridged, for example by touching it with a finger, the elements 121 and 185 luminesce. The photoresistor 131 coupled to the element 121 becomes conducting. When the element 185 luminesces, this results in the bistable multivibrator 182 changing from one stable state to the other, since this element actuates a gate in the multivibrator. The pulse emitted by the bistable multivibrator causes the ring counter 183 to change from the passive intermediate state B to the active state 180 so that a light-radiating element included in the ring counter and coupled to the photosensitive resistor 181 is caused to luminesce. The resistor 181 becomes conducting. Since the register 131 is also conducting, the element 141 receives a voltage and luminesces. As a result of the fact that this element is coupling to the photo-sensitive resistor 151, the element remains alive and consequently continues to luminesce, also when the finger no longer touches the pair of contacts 161, 171. The resistor 131 then passes to the non-conducting state, it is true, but the element 141 is now fed through the photosensitive resistor 151.

When the pair of contacts 161, 171 is opened, this also results in the element 185 extinguishing. The multivibrator 182 consequently changes back to the original stable state and supplies a pulse to the ring counter 183 which passes to the passive intermediate state C.

When subsequently again one of the ten pairs of contacts (160, 170 to 169, 179) is bridged, it is evident that in a manner analogous to that described hereinbefore, an electroluminescent element associated with this pair luminesces in the section shown in FIG. 4 immediately to the left-hand side of the section provided with numerals.

With the aid of only one ten of pairs of contacts, it is possible to strike a number having a number of digits equal to the number of sections.

In order to erase the number obtained, an additional pair of contacts 190, 181 is connected in series with an electroluminescent element 188 across the supply source 186. The element 188 is optically coupled to the photosensitive resistor 187 connected across the series-combination of the source 186 and the resistor 184.

When the pair of contacts 190, 191 is bridged, the element 188 luminesces and the resistor 187 becomes conducting. As a result, the voltage across the sections of the keyboard is reduced so that the still luminescing elements in the keyboard extinguish. At the same time, the element 188 supplies a pulse to the ring counter 183 which is consequently changed to the starting position D.

Figure 5:
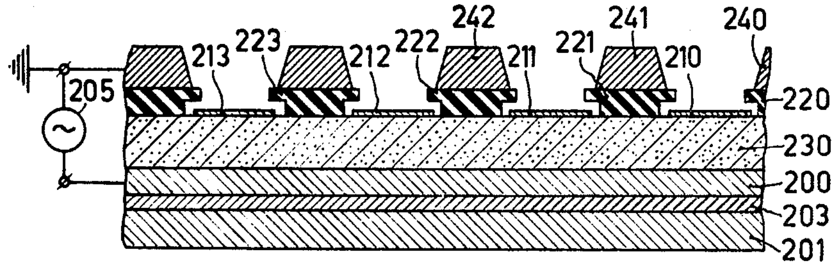
FIG. 5 is a cross-section of a part of keyboard or a switch in accordance with the invention.

FIG. 5 is a cross-section of part of a keyboard in accordance with the invention. A layer 200 of an electroluminescent material, a thin transparent conducting layer 203, preferably of tin oxide ($SnO_2$) and a glass plate 201 are successively adhered to one side of the plate 230 of non-conducting material having a high dielectric constant, preferably of barium titanate. The desired pattern of photoconducting material is applied to the glass plate. Parallel strips 210 to 219 of conducting material (four of which are shown) separated from each other by parallel beams 220 to 229 of insulating material are provided on the other side of the plate 230. Rods 240 to 249 of conducting material are adhered to the beams. When an alternating-voltage source 205 is connected between the luminescent layer 200 and the earthed rods 240 to 249 and when a contact is established, for example, by means of the finger, between the conducting beam 242 and the conducting strip 212, the part of the electroluminescent layer lying below the strip 212 is caused to luminesce and the subjacent part of the photoconducting pattern on the glass plate 201 becomes conducting.

Figure 6:
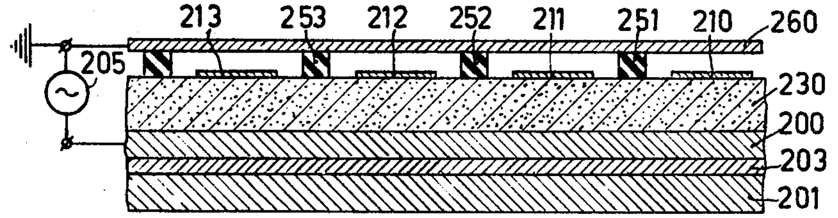
FIG. 6 illustrates a variant of FIG. 5.

FIG. 6 shows a variant of the cross-section of FIG. 5. The beams 220 and 229 are replaced by insulating spacers 250 and 259 and the rods of conducting material by a somewhat elastic foil 260. A slight pressure on the foil causes a momentary contact at the area of the pressure between the foil and the strip so that the subjacent part of the electroluminescent layer luminesces.

What is claimed is:

1. A switching arrangement for selecting one of a plurality of electrical circuits, comprising a source of voltage, a plurality of touch actuatable contact means, a plurality of radiation emitting electroluminescent elements each associated with a respective one of said plurality of touch actuatable contact means, means responsive to actuation of one of said contact means for electrically connecting the electroluminescent means associated with said one of said contact means to said source of voltage, a plurality of radiation responsive photosensitive elements each associated with a respective one of said plurality of electrical circuits and each optically coupled to a respective one of said plurality of electroluminescent element, and means electrically connecting each of said plurality of photosensitive elements associated with a respective one of said plurality of electrical circuits to a respective one of said plurality of electroluminescent elements associated with a different one of said plurality of electrical circuits thereby causing each non-selected one of said plurality of electrical circuits to be rendered inoperative as a result of radiation emitted by that one of said plurality of electroluminescent elements associated with the selected one of said circuits.

2. The combination of claim 1 wherein said means responsive to actuation of one of said contact means comprises a first electroluminescent element connected in series with said contact means and said voltage source and responsive to actuation of said contact means to emit radiation, photosensitive means optically coupled to said first electroluminescent element and responsive to radiation emitted from said first electroluminescent element for electrically connecting said voltage source to the electrical circuit associated with said contact means, a second electroluminescent element electrically connected in series with said photosensitive means and optically coupled to said photosensitive means, said second electroluminescent element responsive to the electrical connection of said source to said circuit for emitting radiation to said photosensitive means for maintaining said electrical connection after removal of activation from said contact means.

3. The combination of claim 2 wherein said photosensitive means comprises a first photoresistive element optically coupled to said first electroluminescent element and a second photoresistive element optically coupled to said second electroluminescent element, said first and second photoresistive elements being electrically connected in parallel.

4. A switching arrangement for selecting one of a plurality of electrical circuits, comprising a plurality of externally actuatable contact means, a first plurality of electroluminescent elements, each of said first plurality of electroluminescent elements being connected in series with said voltage source and a respective one of said externally actuatable contact means, each respective electroluminescent element emitting radiation in response to activation of the respective externally actuatable contact means connected in series therewith, a second plurality of electroluminescent elements, each of said plurality of electrical circuits including one of said second plurality of electroluminescent elements, a first plurality of photoresistive elements each having a characteristically lowered impedance in response to radiation impinging thereon and a characteristically higher impedance in response to an absence of radiation impinging thereon, each of said first plurality of photoresistive elements being optically coupled to a respective one of said first plurality of electroluminescent elements and electrically connected between said voltage source and a respective one of said plurality of electrical circuits, said second plurality of electroluminescent elements each being connected to said source of voltage through a respective one of said first plurality of photosensitive elements, a second plurality of photoresistive elements each associated with a respective one of said plurality of electrical circuits and each optically coupled to a respective one of said second plurality of electroluminescent elements, and means electrically connecting each of said second plurality of photosensitive elements associated with a respective one of said plurality of electrical circuits to a respective one of said second plurality of electroluminescent elements associated with a different one of said plurality of electrical circuits thereby causing each nonselected one of said plurality of electrical circuits to be rendered inoperative as a result of the radiation emitted by that one of said second plurality of electroluminescent elements associated with the selected one of said circuits.

References Cited

UNITED STATES PATENTS

| | | | |
|---|---|---|---|
| 2,432,527 | 12/1947 | Lang. | |
| 2,659,533 | 11/1953 | Quinby et al. | 340—258 |
| 3,112,476 | 11/1963 | Cohler et al. | 250—213 |
| 3,207,905 | 9/1965 | Bray | 340—258 |

ROBERT K. SCHAEFER, *Primary Examiner.*

T. B. JOIKE, *Assistant Examiner.*